United States Patent [19]

Oppenländer et al.

[11] Patent Number: 5,744,066
[45] Date of Patent: Apr. 28, 1998

[54] DEFOAMING AND DEAERATING MIXTURES FOR AQUEOUS MEDIA PRONE TO FOAMING

[75] Inventors: Knut Oppenländer, Ludwigshafen; Gabriele Dralle-Voss, Darmstadt; Rudolf Schuhmacher, Böhl-Iggelheim, all of Germany

[73] Assignee: BASF Aktiengesellschaft, Ludwigshafen, Germany

[21] Appl. No.: 612,500

[22] Filed: Mar. 7, 1996

[30] Foreign Application Priority Data

Mar. 13, 1995 [DE] Germany .................. 195 08 938.3

[51] Int. Cl.$^6$ ................................................. B01D 19/04
[52] U.S. Cl. ........................................ 252/358; 252/321
[58] Field of Search ............................... 252/321, 358

[56] References Cited

U.S. PATENT DOCUMENTS

| | | | |
|---|---|---|---|
| 2,563,856 | 8/1951 | McGinn | 252/358 |
| 2,563,857 | 8/1951 | McGinn | 252/358 |
| 2,903,432 | 9/1959 | Hwa | 252/321 |
| 4,009,119 | 2/1977 | Poschmann et al. | 252/358 |
| 4,265,779 | 5/1981 | Gandolfo et al. | 252/358 |
| 4,631,145 | 12/1986 | Zychal | 252/321 |
| 4,664,844 | 5/1987 | Bergold et al. | 252/358 |
| 4,950,420 | 8/1990 | Svarz | 252/321 |
| 4,976,888 | 12/1990 | De Clercq et al. | 252/358 |
| 5,326,499 | 7/1994 | Wagner et al. | 252/321 |

FOREIGN PATENT DOCUMENTS

| | | |
|---|---|---|
| 0 142 812 | 5/1985 | European Pat. Off. |
| 0 322 830 | 7/1989 | European Pat. Off. |
| 30 01 387 | 7/1981 | Germany . |
| 34 23 994 | 1/1985 | Germany . |
| 41 27 719 | 2/1993 | Germany . |

*Primary Examiner*—Richard D. Lovering
*Assistant Examiner*—Daniel S. Metzmaier
*Attorney, Agent, or Firm*—Oblon, Spivak, McClelland, Maier, & Neustadt, P.C.

[57] ABSTRACT

Defoaming and deaerating mixtures based on oil-in-water emulsions where the oil phase comprises from 5 to 75% by weight of the emulsion for aqueous media prone to foaming, wherein the oil phase comprises a) at least one alcohol having at least 12 carbon atoms, distillation residues obtainable in the course of the production of alcohols having a higher carbon number by the oxo process or by the Ziegler process, or mixtures thereof, b) at least one ester of a sugar alcohol having at least 4 OH groups or at least 2 OH groups and at least one intramolecular ether bond and a fatty acid having at least 20 carbon atoms in a molar ratio of 1:at least 1, in which case the free OH groups of these esters are optionally wholly or partly esterified with $C_{12}$–$C_{18}$-carboxylic acids, and optionally c) fatty acid esters of alcohols having at least 22 carbon atoms and $C_1$–$C_{36}$-carboxylic acids, fatty acid esters of $C_{12}$–$C_{22}$-carboxylic acids and monohydric, dihydric or trihydric $C_1$–$C_{20}$-alcohols, polyethylene waxes, natural waxes or mixtures thereof, and optionally d) hydrocarbons having a boiling point above 200° C., fatty acids having from 12 to 22 carbon atoms, or mixtures thereof are useful for foam control in relation to aqueous media prone to foaming, in particular for foam control in pulp cooking, pulp washing, the beating of paper stock, papermaking and the dispersing of pigments for papermaking.

6 Claims, No Drawings

DEFOAMING AND DEAERATING MIXTURES FOR AQUEOUS MEDIA PRONE TO FOAMING

BACKGROUND OF THE INVENTION

1. Field of the Invention

The present invention relates to defoaming and deaerating mixtures based on oil-in-water emulsions where the oil phase comprises from 5 to 75% by weight of the emulsion for aqueous media prone to foaming, and to the use of the defoaming and deaerating mixtures for foam control of aqueous media prone to foaming, in particular for foam control in pulp cooking, pulp washing, the beating of paper stock, papermaking and the dispersing of pigments for papermaking.

2. Discussion of the Background

EP-A-0 142 812 discloses defoamers based on oil-in-water emulsions where the oil phase comprises from 15 to 60% by weight of the emulsion and contains as essential components for example a $C_{12}$–$C_{26}$-alcohol and/or fatty acid ester of $C_{12}$–$C_{22}$-carboxylic acids with a mono- to trihydric $C_1$–$C_{18}$-alcohol and optionally a hydrocarbon having a boiling point above 200° C. The oil-in-water emulsions are stabilized to viscosity increase and creaming on storage by the addition of from 0.05 to 0.5% by weight of a high molecular weight, water-soluble homo- or copolymer of acrylic acid, methacrylic acid, acrylamide or methacrylamide.

U.S. Pat. No. 4,950,420 discloses defoamers which are used in papermaking and which consist of a mixture of a surface-active polyether and of an ester of a polyhydric alcohol and a fatty acid. The polyether component is derived for example from polyoxyalkylated glycerol, sorbitol or sucrose. The ester component consists for example of a mono- or diester of polyethylene glycol and oleic or stearic acid. The mixtures may also contain as ester component esters of, for example, glycerol or sorbitol and oleic acid or tallow fatty acid. They may optionally be further modified by alkoxylation.

SUMMARY OF THE INVENTION

It is an object of the present invention to provide defoamers and/or deaerators which are highly effective not only at room temperature but also at temperatures of 50° C., for example.

We have found that this object is achieved by defoamers and/or deaerators based on oil-in-water emulsions where the oil phase comprises from 5 to 75% by weight of the emulsion for aqueous media prone to foaming, wherein the oil phase comprises a) at least one alcohol having at least 12 carbon atoms, distillation residues obtainable in the course of the production of alcohols having a higher carbon number by the oxo process or by the Ziegler process, or mixtures thereof, b) at least one ester of a sugar alcohol having at least 4 OH groups or at least 2 OH groups and at least one intramolecular ether bond and a fatty acid having at least 20 carbon atoms in a molar ratio of 1:at least 1, in which case the free OH groups of these esters are optionally wholly or partly esterified with $C_{12}$–$C_{18}$-carboxylic acids, and optionally c) fatty acid esters of alcohols having at least 22 carbon atoms and $C_1$–$C_{36}$-carboxylic acids, fatty acid esters of $C_{12}$–$C_{22}$-carboxylic acids and monohydric, dihydric or trihydric $C_1$–$C_{20}$-alcohols, polyethylene waxes, natural waxes or mixtures thereof, and optionally d) hydrocarbons having a boiling point above 200° C., fatty acids having from 12 to 22 carbon atoms, or mixtures thereof.

The present invention also provides for the use of said defoamers and/or deaerators for foam control of aqueous media prone to foaming, in particular for foam control in pulp cooking, pulp washing, the beating of paper stock, papermaking and the dispersing of pigment for papermaking.

DETAILED DESCRIPTION OF THE INVENTION

Component (a) of the oil-in-water emulsions comprises in particular alcohols having at least 12 carbon atoms or mixtures thereof. The alcohols are in most cases monohydric alcohols which have up to 48 carbon atoms in the molecule, for example. Such products are commercially available. However, it is also possible to use as component (a) fatty alcohols which have a significantly higher number of carbon atoms in the molecule. The alcohols of components (a) are either natural or synthetic alcohols. Examples of suitable alcohols are lauryl alcohol, myristyl alcohol, cetyl alcohol, palmityl alcohol, stearyl alcohol, behenyl alcohol, oleyl alcohol, ricinoleyl alcohol, linoleyl alcohol and erucyl alcohol.

Component (a) may in some cases also comprise advantageous mixtures of (1) alcohols having from 12 to 26 carbon atoms and (2) alcohols having from 28 to 48 carbon atoms.

The synthetic alcohols possible for use as component (a), which are obtainable for example by the Ziegler process by oxidation of aluminum alkyls, are saturated, straight-chain unbranched alcohols. Synthetic alcohols are also obtained by the oxo process. In this case the products are typically alcohol mixtures. As component (a) of the oil phase of the defoamer emulsions it is also possible to use distillation residues which are obtainable in the course of the preparation of the aforementioned alcohols by the oxo process or by the Ziegler process. Such distillation residues may comprise for example up to 85% by weight of alcohols, while the remainder comprises other, unidentified compounds.

If desired, it is also possible to use as component (a) alkoxylated distillation residues which are obtained in the abovementioned process for preparing higher alcohols. Such distillation residues are alkoxylated for example by known methods with ethylene oxide or with propylene oxide or else with a mixture of ethylene oxide and propylene oxide, for example up to 5 ethylene oxide and/or propylene oxide groups are added per OH group of alcohol in the distillation residue. Preferably, from 1 to 2 ethylene oxide groups are added per OH group of alcohol in the distillation residue.

The compounds of component (a) may form part of component (a) of the oil phase of the oil-in-water emulsions either alone or mixed with each other in any desired ratio. The oil phase contains for example from 99 to 20, preferably 40 to 70%, by weight of at least one compound of component (a).

The defoamers and/or deaerators based on oil-in-water emulsions contain in the oil phase as component (b) at least one ester of a sugar alcohol having at least 4 OH groups or at least 2 OH groups and at least one intramolecular ether bond and a fatty acid having at least 20 carbon atoms in a molar ratio of 1:at least 1, in which case the free OH groups of these esters are optionally wholly or partly esterified with $C_{12}$–$C_{18}$-carboxylic acids. Component (b) preferably comprises at least one ester of tetritols, pentitols and/or hexitols with fatty acids having at least 22 carbon atoms in a molar ratio of 1:at least 1.9. Particular preference as component (b) is given to esters of mannitol and/or sorbitol with behenic acid in a molar ratio of 1:at least 1, preferably 1:at least 1.9. In addition to the preferred sugar alcohols sorbitol and mannitol, it is also possible to use adonitol, arabitol, xylitol, dulcitol, pentaerythritol, anhydro sugar alcohols such as sorbid and sorbitan and erythritol. Sugar alcohols are for example the polyhydroxy compounds formed from monosaccharides by reduction of the carbonyl function, which polyhydroxy compounds are themselves not sugars. It is also possible to use the anhydro compounds formed from the sugar alcohols by intramolecular elimination of water.

The esters of component (b) are prepared by esterifying a sugar alcohol, or a mixture of a plurality of sugar alcohols, with a fatty acid containing at least 20 carbon atoms in a molar ratio of 1:at least 1.5. Preferably, the sugar alcohols are esterified with fatty acids having from 22 to 30 carbon atoms in the molecule, for example with behenic acid. As well as behenic acid it is also possible to use for example the following long-chain fatty acids: erucic acid, chysanodonic acid, lignoceric acid, montan wax acid and hexacosanic acid.

The sugar alcohols are preferably reacted with the long-chain fatty acids in a molar ratio of 1:at least 1.9. This may involve all or some of the alcohol groups of the sugar alcohols becoming esterified with the fatty acids containing at least 20 carbon atoms. However, it is also possible to use as component b) those esters which are obtainable from a sugar alcohol having at least 4 OH groups and fatty acid having at least 20 carbon atoms in a molar ratio of 1:at least 1 to, for example, 3, in which case the free OH groups of these esters are wholly or partly esterified with $C_{12}$–$C_{18}$-carboxylic acids. Such esters can be prepared for example by stepwise esterification with the fatty acids having different numbers of carbon atoms or else in a singlestage reaction. Examples of suitable $C_{12}$–$C_{18}$-fatty acids are lauric acid, myristic acid, palmitic acid, stearic acid, oleic acid and linoleic acid. It is also possible to use mixtures of these carboxylic acids for esterifying the sugar alcohols. The esterification reaction typically takes place in the presence of an acid or a basic esterification catalyst such as sulfuric acid, p-toluenesulfonic acid, citric acid, phosphorous acid, phosphoric acid, hypophosphorous acid, Lewis acid, e.g. tetraethyl orthotitanate, tetrabutyl orthotitanate, tin dioxide, dibutyltin dilaurate, boron trifluoride or aluminum chloride or basic catalysts such as sodium methoxide or potassium tert-butoxide. The compounds of component (b) are present in the oil phase, either alone or mixed with each other, in a proportion from 1 to 80, preferably 5 to 30%, by weight. The esterification reaction with acid catalysts may convert open-chain sugar alcohols into the corresponding anhydro sugar alcohols by intramolecular ether formation. In this way the esterification of sorbitol with fatty acids may give rise to sorbitan and sorbid fatty acid esters as well as the sorbitol fatty acid esters.

Component (c) of the oil phase of the defoamers and/or deaerators comprises fatty acid esters of alcohols having at least 22 carbon atoms and $C_1$–$C_{36}$-carboxylic acids, fatty acid esters of $C_{12}$–$C_{22}$-carboxylic acids and 1-, 2- or 3-hydric $C_1$–$C_{20}$-alcohols, polyethylene waxes, natural waxes or mixtures thereof. The fatty acids underlying the esters include for example lauric acid, myristic acid, palmitic acid, stearic acid, arachic acid and behenic acid. The esters are preferably prepared using palmitic acid, oleic acid or stearic acid. It is possible to use monohydric $C_1$–$C_{18}$-alcohols for esterifying the carboxylic acids mentioned, for example methanol, ethanol, propanol, butanol, hexanol, decanol and stearyl alcohol, but also dihydric alcohols such as ethylene glycol or trihydric alcohols such as glycerol. The polyhydric alcohols may be completely or partially esterified. Suitable components (c) also include natural waxes, such as the commercially obtainable montan ester waxes, montan acid waxes and carnauba waxes. Examples of suitable synthetic waxes are polyethylene waxes having an average molecular mass of at least 2000. If a compound of component (c), or a mixture of a plurality of compounds of component (c), is present in the oil-in-water emulsions, they will be present in the oil phase in amounts from, for example, 1 to 50% by weight.

The oil phase of the emulsions may optionally additionally comprise, as component d), hydrocarbons having a boiling point above 200° C. (at 1013 mbar), fatty acids having from 12 to 22 carbon atoms or mixtures thereof. Preferred hydrocarbons are paraffin oils such as the commercially available paraffin mixtures also known as white oil. The use of compounds of component (d) is as stated, optional. If they are used, they will be present in the oil phase of the oil-in-water emulsions in an amount from 1 to 50% by weight.

To prepare the novel defoaming and deaerating mixtures based on oil-in-water emulsions, the oil phase is emulsified into the aqueous phase. This usually requires apparatus in which the components of the emulsion are subjected to a steep shear gradient, for example dispersers. To obtain particularly stable oil-in-water emulsions, the emulsification of the oil phase in the aqueous phase is preferably carried out in the presence of surface-active substances which have an HLB value of more than 6 (for definition of HLB value cf. W. C. Griffin, Journal of the Society of Cosmetic Chemists, 5 (1954), 249–256). The surface-active substances are oil-in-water emulsifiers or typical wetting agents. Of the surface-active substances, it is possible to use anionic, cationic or nonionic compounds or mixtures of these compounds which are compatible with each other, for example mixtures of anionic and nonionic or cationic and nonionic wetting agents. Substances of the type mentioned include for example sodium or ammonium salts of higher fatty acids, ammonium oleate or ammonium stearate, alkoxylated alkylphenols such as nonylphenol or isooctylphenol, which have been reacted with ethylene oxide in a molar ratio of from 1:2 to 1:50, ethoxylated unsaturated oils, for example the reaction products of one mole of castor oil and from 30 to 40 mol of ethylene oxide or the reaction products of one mole of stearyl alcohol with from 60 to 80 mol of ethylene oxide. The emulsifiers used are preferably sulfated ethoxylation products of nonylphenol or octylphenol, which are present in the form of the sodium or ammonium salts of the corresponding sulfuric hydrogen esters. 100 parts by weight of the oil-in-water emulsions may optionally contain from 0.1 to 5, preferably from 0.5 to 2, parts by weight of an emulsifier or emulsifier mixture. As well as the aforementioned emulsifiers it is also possible to use protective colloids such as high molecular weight polysaccharides and soaps or other customary additives such as stabilizers in the preparation of the oil-in-water emulsions. For instance, the addition of from 0.05 to 0.5% by weight, based on the total emulsion, of high molecular weight water-soluble homoand copolymers of acrylic acid, methacrylic acid, acrylamide or methacrylamide as stabilizer is useful. The use of such stabilizers forms for example part of the subject-matter of the aforementioned EP-A-0 149 812.

Emulsifying the oil phase into the aqueous phase gives oil-in-water emulsions which have a viscosity within the range from, for example, 300 to 3000 mPa.s immediately following preparation and which have an average oil phase particle size of below 25 μm, preferably within the range from 0.5 to 15 μm.

Although the compounds of component (b) alone or mixed with hydrocarbon have virtually no activity as oil-in-water emulsion defoamers, a combination of at least one compound of component (b) with at least one compound of component (a) surprisingly has a synergistic effect. The defoamers and/or deaerators of the present invention have an unexpectedly high level activity in aqueous systems which tend to foam, not only at room temperature but also at higher temperatures, for example at temperatures above 40° C. The oil-in-water emulsions of the present invention are preferably used as defoamers and/or deaerators for foam control in relation to aqueous media prone to foaming, for example in the food industry, the starch industry and in sewage plants Of particular interest is the use of the defoamers and/or deaerators for foam control in pulp cooking, pulp washing, the beating of paper stock, papermaking and the dispersing of pigments in papermaking. In these processes, the temperature of the aqueous medium to be defoamed is usually above 40° C., for example within the range from 45° to 75° C. The novel mixtures based on oil-in-water emulsions act as defoamers and as deaerators. When these mixtures are used in paper stock suspensions, for example, their deaerating action is predominant. Based on 100 parts by weight of paper stock in a foam-forming medium, up to 0.5, preferably 0.05 to 0.3, part by weight of the defoamers and/or deaerators of the present invention is used. The parts indicated in the Examples are by weight. The percentages are based on the weight of the substances. The average particle size of the water-emulsified particles of the oil phase can be determined with the aid of a Coulter Counter. The K value of polymers was determined by the method of H. Fikentscher, Cellulose-Chemie, 13 (1932), 58–64, 71–74, in aqueous solution at a temperature of 25° C. in a concentration of 0.5% by weight at pH 7.

Determination of the foam value:

5 l of a foam-developing paper stock suspension (0.1% of groundwood) are pumped for 5 minutes through a trough made of transparent plastic. The amount of foam formed at the surface of the stock suspension is then measured in area units (cm$^2$) with the aid of a grid on the wall of the trough and reported as so-called foam value to indicate the effectiveness of a defoamer.

If the paper stock suspension is recirculated in the absence of a defoamer the foam value obtained is from 1200 to 1250 cm$^2$. Adding to the paper stock suspension in each case 2 mg/l of an effective defoamer (a total of 10 mg solid) distinctly reduces this value, so that it represents a measure of the effectiveness of a defoamer.

Testing of defoamers:

The temperature of the paper stock suspension in the examples is 40° or 50° C., and the temperature is kept constant to ±1° C. during the 5-minute test.

Since the foam blank is different at 40° C. and at 50° C., the effectiveness of a defoamer is presented as percentage residual foam. The percentage residual foam (R) is calculated as $$R = \frac{S_e \cdot 100}{S_o},$$

where $S_e$ is the foam value measured following addition of a defoamer and $S_o$ the foam blank, i.e. the value which is measured in the absence of a defoamer. Under these conditions, the smaller R, the better the defoamer.

EXAMPLES

Preparation of Sugar Alcohol Esters

Sugar alcohol ester 1

A flask equipped with a stirrer and a stillhead is charged with 509 g of behenic acid and 137 g of sorbitol, followed by 1% by weight, based on the mixture, of hypophosphorous acid as catalyst. The reaction mixture is heated, and the water formed in the course of the esterification is distilled off with stirring at a pressure of about 20 mbar. To monitor the course of the reaction, samples are taken of the reaction mixture. The acid number is determined and the course of the reaction is monitored by IR spectroscopy. As soon as the acid number is below 10 mg of KOH/g, the reaction is discontinued and the reaction mixture is cooled down. The reaction time was 12 hours. Sorbitan dibehenate was obtained with an acid number of 5.6.

Sugar alcohol ester 2

The preparation of sugar alcohol ester 1 is repeated using 137 g of mannitol instead of the sorbitol. Following a reaction time of 11 hours the esterification is virtually complete. Mannitol dibehenate is obtained with an acid number of 6.3.

Example 1

First an oil phase is prepared by mixing
a) 60 parts of a $C_{16}$–$C_{20}$-alcohol mixture,
b) 6 parts of sugar alcohol ester 1 and
c) 34 parts of the glycerol triester of $C_{16}/C_{18}$ fatty acids with one another while heating to a temperature of 110° C.

Separately, an aqueous phase is prepared from 65 parts of water, 3 parts of an emulsifier obtainable by addition of 25 mol of ethylene oxide to 1 mol of isooctylphenol and esterification of the addition product with sulfuric acid to the acid ester, and 1 part of a K 270 copolymer of 70% of acrylamide and 30% of acrylic acid. The aqueous solution thus obtained is heated to 80° C. A disperser is then used to prepare an oil-in-water emulsion by adding the above-described oil phase to the hot aqueous phase at 80° C. with dispersing. The two different phases are used in such a ratio that the oil phase will comprise 30% by weight of the emulsion and has an average particle size of 3 to 10 μm. Immediately following preparation the oil-in-water emulsion has a viscosity of 340 mPa.s at 20° C.

Example 2

First an oil phase is prepared by mixing
a) 60 parts of a $C_{16}$–$C_{20}$-fatty alcohol mixture,
b) 6 parts of sugar alcohol ester 2,
c) 17 parts of the glycerol triester of $C_{16}/C_{18}$ fatty acids and
d) 17 parts of a mineral oil (commercially available white oil) while heating to 110° C. and emulsifying the mixture by means of a disperser under the conditions indicated in Example 1 into the aqueous phase described in Example 1. The oil-in-water emulsion thus obtainable has a viscosity of 555 mPa.s at 20° C. immediately following preparation. The proportion of the oil phase in the emulsion is 30% as in Example 1.

Example 3

Example 2 is repeated with the sole exception that sugar alcohol ester 1 is used as component (b). The oil-in-water emulsion thus obtainable has a viscosity of 330 mPa.s at 20° C. immediately following preparation.

Example 4

First an oil phase is prepared by mixing a) 90 parts of a $C_{16}$–$C_{20}$-alcohol mixture and b) 10 parts of sugar alcohol ester 1, while heating to 110° C. and then emulsifying the mixture under the conditions indicated in Example 1 into the aqueous phase likewise described there. The proportion of the oil phase in the emulsion is 20%. The oil-in-water emulsion thus obtainable has a viscosity of 315 mPa.s at 20° C. immediately following preparation.

Comparative Example 1

First an oil phase is prepared by mixing (1) 34 parts of glycerol triester of $C_{16}$–$C_{18}$-fatty acids and (2) 66 parts of sugar alcohol ester 1 while heating to 110° C. and then emulsifying the mixture by means of a disperser into the aqueous phase described in Example 1 under the conditions indicated there. The result obtained is an oil-in-water emulsion which, immediately following preparation, has a viscosity of 400 mPa.s at 20° C. The oil phase comprises 30% of the emulsion and has an average particle size from 3 to 10 μm.

Comparative Example 2

Comparative Example 1 is repeated with the sole exception that sugar alcohol ester 2 is used as component (2) of the oil phase. The oil-in-water emulsion thus obtainable has a viscosity of 350 mPa.s. at 20° C. immediately following preparation.

Comparative Example 3

First an oil phase is prepared by mixing (1) 90 parts of glycerol triester of $C_{16}/C_{18}$ fatty acids and (2) 10 parts of sugar alcohol ester 1 while heating to 110° C. and then emulsifying the mixture under the conditions indicated in Example 1 into the aqueous phase likewise indicated there so as to obtain an oil-in-water emulsion having an oil phase content of 20%. Immediately following preparation the emulsion has a viscosity of 220 mPa.s at 20° C.

Comparative Example 4

First an oil phase is prepared by mixing (1) 66 parts of $C_{16}$–$C_{20}$-alcohol mixture and (2) 34 parts of glycerol triester of $C_{16}/C_{18}$ fatty acids while heating to 110° C. and then emulsifying the oil phase into the aqueous phase described in Example 1 so as to obtain an an oil-in-water emulsion having an oil phase content of 30%. The oil-in-water emulsion thus obtainable has a viscosity of 340 mPa.s at 20° C. immediately following preparation.

The oil-in-water emulsions described in the Examples and Comparative Examples are tested at temperatures of 40° and 50° C. in respect of their defoaming action on the above-described foam-developing paper stock suspension. The results obtained are indicated in the table below.

TABLE

| Example | Residual foam [%] determined at | |
|---|---|---|
| | 50° C. | 40° C. |
| 1 | 9 | 9 |
| 2 | 7 | 7 |
| 3 | 8 | 7 |
| 4 | 7 | 11 |
| Comparative Example | | |
| 1 | 46 | 40 |
| 2 | 31 | 33 |
| 3 | 48 | 41 |
| 4 | 29 | 13 |

We claim:

1. A defoaming and deaerating oil-in-water emulsion where the oil phase is present in an amount of 5 to 75% by weight of the emulsion, wherein the oil phase comprises
   a) from 99 to 20% of a component selected from the group consisting of (i) at least one fatty alcohol having at least 12 carbon atoms, (ii) distillation residues obtainable in the course of the production of alcohols having at least 12 carbon atoms by the oxo process or by the Ziegler process, and (iii) mixtures thereof,
   b) from 1 to 80% of a component selected from the group consisting of at least one ester of a sugar alcohol having (i) at least 4 OH groups or (ii) at least 2 OH groups and at least one intramolecular ether bond, and a fatty acid having at least 20 carbon atoms, in a molar ratio of 1:at least 1.9, wherein when said ester contains free OH groups, said ester is optionally wholly or partly esterified with $C_{12}$–$C_{18}$-carboxylic acids, and optionally,
   c) a compound selected from the group consisting of (i) fatty acid esters of alcohols having at least 22 carbon atoms and $C_1$–$C_{36}$-carboxylic acids, (ii) fatty acid esters of $C_{12}$–$C_{22}$-carboxylic acids and monohydric, dihydric, or trihydric $C_1$–$C_{20}$-alcohols, (iii) polyethylene waxes, (iv) natural waxes and (v) mixtures thereof, and optionally
   d) a compound selected from the group consisting of (i) hydrocarbons having a boiling point above 200° C., (ii) fatty acids having from 12 to 22 carbon atoms, and (iii) mixtures thereof.

2. The emulsion as claimed in claim 1, wherein component (b) comprises at least one ester of tetritols, pentitols and/or hexitols with fatty acids having at least 22 carbon atoms.

3. The emulsion claimed in claim 1, wherein component (b) comprises at least one ester of mannitol and/or sorbitol with behenic acid.

4. The emulsion as claimed in claim 1, wherein the oil phase comprises from 40 to 70% of at least one compound of component (a).

5. The emulsion as claimed in claim 1, wherein the oil phase comprises from 5 to 30% of at least one compound of component (b).

6. The emulsion as claimed in claim 5, wherein the oil phase comprises from 40 to 70% of at least one compound of component (a).

* * * * *